United States Patent
Laws et al.

(10) Patent No.: US 6,640,598 B1
(45) Date of Patent: Nov. 4, 2003

(54) HEAT SHIELDS

(75) Inventors: William Robert Laws, Forest Green (GB); Geoffrey Ronald Reed, The Glade (GB)

(73) Assignee: Encomech Engineering Services Ltd., Epsom (GB)

( * ) Notice: Subject to any disclaimer, the term of this patent is extended or adjusted under 35 U.S.C. 154(b) by 0 days.

(21) Appl. No.: 09/936,134

(22) PCT Filed: Feb. 29, 2000

(86) PCT No.: PCT/GB00/00708

§ 371 (c)(1),
(2), (4) Date: Sep. 10, 2001

(87) PCT Pub. No.: WO00/54901

PCT Pub. Date: Sep. 21, 2000

(30) Foreign Application Priority Data

Mar. 15, 1999 (GB) .............................................. 9905936

(51) Int. Cl.⁷ .............................................. B21B 27/06
(52) U.S. Cl. ............................ 72/200; 72/202; 414/159
(58) Field of Search ...................... 72/200, 202, 342.1; 432/65, 249; 414/147, 159

(56) References Cited

U.S. PATENT DOCUMENTS

| | | |
|---|---|---|
| 4,343,168 A | 8/1982 | Laws et al. |
| 4,452,587 A | 6/1984 | Laws et al. |
| 4,499,746 A * | 2/1985 | Laws et al. .................... 72/202 |
| 4,554,812 A | 11/1985 | Hirschmanner et al. |
| 4,719,779 A | 1/1988 | Laws et al. |
| 4,736,608 A | 4/1988 | Laws et al. |
| 5,033,926 A | 7/1991 | Laws et al. |
| 5,101,652 A * | 4/1992 | Burk et al. .................... 72/200 |
| 5,699,694 A | 12/1997 | Laws et al. |
| 5,711,175 A | 1/1998 | Laws et al. |
| 5,960,663 A | 10/1999 | Laws et al. |

FOREIGN PATENT DOCUMENTS

| | | | |
|---|---|---|---|
| EP | 0 005 340 | 11/1979 | |
| EP | 0 048 503 | 3/1982 | |
| EP | 0 059 093 | 9/1982 | |
| GB | 1 603 428 | 11/1981 | |
| JP | 59-104210 | * 6/1984 | .................. 72/202 |

OTHER PUBLICATIONS

Iron and Steel Engineer, vol. 66, No. 12, Dec. 1, 1989, pp. 17–25.

* cited by examiner

*Primary Examiner*—Ed Tolan
(74) *Attorney, Agent, or Firm*—Larson & Taylor PLC

(57) ABSTRACT

A heat shield arrangement (12) for a roller table (2) comprising respective upper and lower series of heat shield panels (32,34,36,18) above and below a hot material path (42) along the table. The lower series of panels (18) includes at least one panel that is displaceable to permit a greater radiation loss from a central region of the path (42) than from laterally outer regions to each side of the central region. The upper series of panels includes at least one central panel (34) and at least two laterally outer panels (32,36) on opposite sides of said central panel (34), the outer panels (32,36) being suspended from a primary support structure (26) and said central panel (34) being suspended from an auxiliary support structure (30) displaceable relative to the primary support structure (26) to raise said central panel (34) relative to the outer panels (32,36). By these means a more uniform lateral temperature profile can be obtained even for thick transfer bars.

9 Claims, 6 Drawing Sheets

HEAT SHIELDS

FIELD OF THE INVENTION

This invention relates to heat shields for roller tables, for example for use with transfer tables for supplying the finish roll stands of metal hot rolling mills.

This application is a 35 USC 371 of PCT/GB00/00708 filed Feb. 29, 2000.

BACKGROUND OF THE INVENTION

In the hot rolling of steel in slab form, when a transfer bar is driven by rollers along a transfer table upstream of the finishing mill, heat loss from the bar will be greater at the side edges than at the centre of the bar. It is known to use electrical induction heaters to compensate for the increased heat loss and edges, but such heaters are both costly to install and expensive to operate.

It is also known to deploy heat shield panels around the hot material path to reduce heat loss, and in particular such heat shields have been employed to reduce the head-to-tail temperature variation along the length of a transfer bar.

For the reduction of transverse temperature variations by the use of heat shields, it has been proposed to make the heat shield panels laterally displaceable (EP 048503) to leave a gap at the centre of the hot material path so that the heat radiation rate over the control region is allowed to increase to be closer to the radiation rate at the edges, but usually there is insufficient space to allow this method to be employed effectively. It has also been proposed to tilt the upper panels to each side of the centre line of the material path to form a V-arched profile, but again only a very limited effect can be achieved due to space limitations.

It has also been proposed to pivot the bottom panels below the hot material path away from the path. While this may have a greater influence on the temperature variation across the width of the bottom face of the transfer bar, that will only have the desired effect at the top face of the bar if the bar thickness is not too great. For thicknesses of 25 mm or more, there will be an increasingly greater divergence of temperature between the opposite faces of the bar if heat is allowed to radiate freely from one face only.

In the industry, however, there is trend to produce larger and heavier finished steel strip coils using existing mill layouts. This required heavier and thicker transfer bars and bar thicknesses of 40–45 mm are now common, while thicknesses of 55 mm are known. With these increased thicknesses, not only is it not possible to effect the temperature distribution through the thickness of the bar by controlling heat loss from one face, but also the potential lateral temperature variation from increased edge heat loss grows greater.

SUMMARY OF THE INVENTION

According to one aspect of the present invention, there is provided a heat shield arrangement for a roller table comprising respective upper and lower series of heat shield panels above and below a hot material path along the table, the lower series of panels comprising at least one panel that is displaceable to permit a greater radiation loss from a central region of the path than from laterally outer regions to each side of said central region, the upper series of panels comprising at least one central panel and at least two laterally outer panels on opposite sides of said central panel, said outer panels being suspended from a primary support structure and said central panel being suspended from an auxiliary support structure displaceable relative to the primary support structure to raise said central panel relative to the outer panels.

By these means a more uniform lateral temperature profile can be obtained even for thick transfer bars. It will be understood, however, that when rolling slab thicknesses which are small enough for which sufficient control of temperature distribution to be exercised by regulating the heat loss from one main face of the hot slab, such regulation can be exercised from the top face alone.

According to another, more general, aspect of the invention, therefore, there is provided a heat shield arrangement for a roller table comprising a series of heat shield panels extending over a hot material path along the table, the panels comprising at least two outer panels on laterally opposite sides of at least one central panel, said central panel being displaceable to a raised position relative to the outer panels to permit an increase of heat radiation from a central region of the hot material path.

In a preferred arrangement according to this aspect of the invention, in the or each group of laterally juxtaposed panels, the outer panels are mounted on a primary support structure and said at least one central panel is mounted on an auxiliary support structure displaceable relative to the primary support structure to raise said central panel relative the outer panels.

Preferably, the auxiliary support structure is mounted on the primary support structure. If the heat shield panels over the table are required to be lifted quickly clear of the table, eg. to avoid being damaged by a deformed transfer bar, a displacement mechanism for the primary support structure will then be able to lift all the panels together. In an alternative arrangement, however, the outer panels are lifted, when required, by a displacement mechanism acting through the auxiliary support structure.

In a heat shield arrangement according to the invention, and in which displaceable central heat shield panels are located both above and below the hot material path, preferably displacement control means are adapted to move the upper and lower panels simultaneously away from the path.

The invention will be more fully described by way of example with reference to the accompanying drawings.

DESCRIPTION OF EMBODIMENTS OF THE INVENTION

Figure 1:
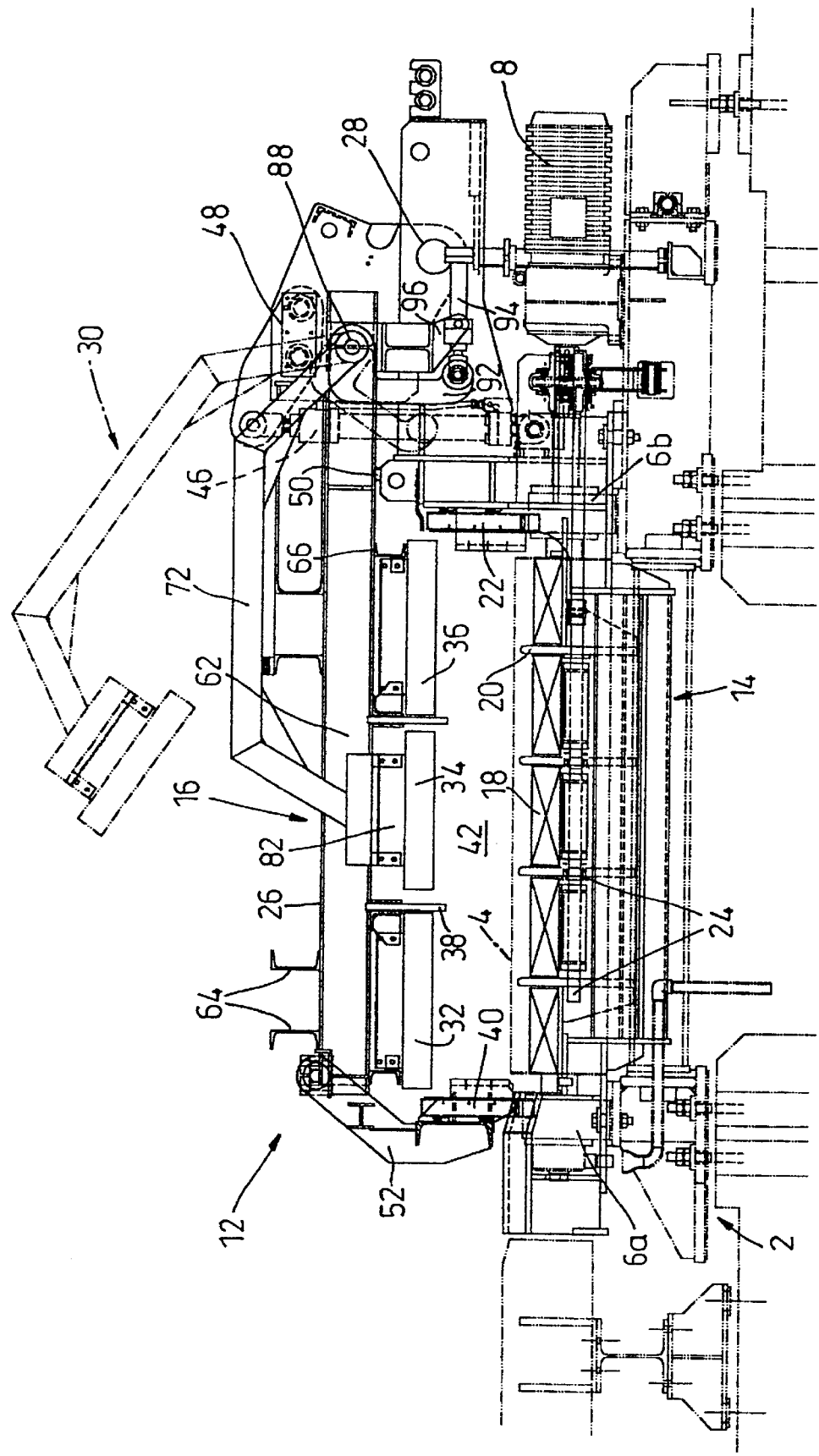
FIG. 1 is a transverse cross-sectional view of a transfer table provided with a heat shield arrangement according to the invention.

Referring firstly to FIGS. 1–4, the transfer table 2 itself, with a series of parallel rollers 4 mounted in bearings 6a, 6b, and associated equipment, such as the drive motors 8 for the rollers, are shown in broken lines in FIG. 1, and is generally conventional in form. Shown in full lines is a heat shield arrangement 12 for the table, comprising a fixed lower frame structure 14 and a moveable upper frame structure 16 mounted on the fixed lower structure.

The heat shield arrangement 12 may be fabricated as a unit to be retrofitted to an existing transfer table 2, or it can be integral with the transfer table structure. It will be understood that the transfer table will typically have a length of the order of tens of metres in the direction perpendicular to the plane of FIG. 1, FIGS. 1–4 illustrating only one of a number of corresponding modules, each having a lower and an upper frame structure 14,16, from which the complete heat shield arrangement, extending the length of the table, is built up.

The lower frame structure 14 carries lower heat insulating panels 18 and bumper bars 20 located below the rollers 4. On the drive side of the table, side insulating panels 22 are also mounted on the fixed lower frame structure 14. The lower heat shield panels 18 are arranged in groups of five across the width of the table. The two laterally outer panels are fixed, but the three central panels are pivotable supported on pivot mountings 24 connected to rams (not shown) so that the panels can be swung downwards away from the rollers, as described in EP 857523 (98300511.7), the contents of which are incorporated herein by reference. It is thus possible to vary the heat radiation rate downwardly from a hot transfer bar on the table.

The upper frame structure of the heat shield arrangement, that is to say, the illustrated module, comprises a primary frame 26 pivoted on the lower frame structure 14 through pivot bearings 28 to one side of the transfer table 2, and an auxiliary frame 30 pivoted on the main frame, as will be described in more detail below. On the upper frame structure are mounted series of upper heat insulating panels 32,34,36 and bumper bars 38, and at the side of the table remote from the drive side, further side insulating panels 40. The side and upper panels 22,32,34,36,40, with the table rollers 4 define a hot material path 42 for the movement of transfer bars along the table.

All the heat insulating panels are preferably of the re-radiating type described in GB 1603428 and EP 059093, having thin-walled hot faces directed towards the material path to limit heat loss by radiation from the material.

Rams 46 connected between the lower and upper frame structures 14,16 are able to swing the upper structure about the pivot bearings 28 to lift it and the upper heat shield panels 32,34,36 away from the table 2 to give access to the table or to allow free radiation of heat from the upper face of a transfer bar on the table. The rams 46 can also be actuated automatically to move the panels away from distorted stock on the transfer table should the transfer bar strike the upper bumper bars 38. The upper frame structure 16 is able to yield slightly to the force on the bumper bars because it is connected to the rams 46 through a lost-motion linkage 48. A proximity switch 50 on the fixed frame near the pivot mounting 28 senses the movement of the frame structure 16 and switches the rams 46 to raise the structure 16 fully and protect against damage. The manner of control of the lifting of the upper frame structure 16 can be generally as described in EP 010976, to which reference can be made for further details.

The side panels 40 are pivotally suspended from their mountings 52 so that they will swing outwards if their protection bolsters 40a are struck by a distorted bar. A further proximity switch (not shown) will then trigger the lifting of the frame structure to protect against damage.

Figure 2:
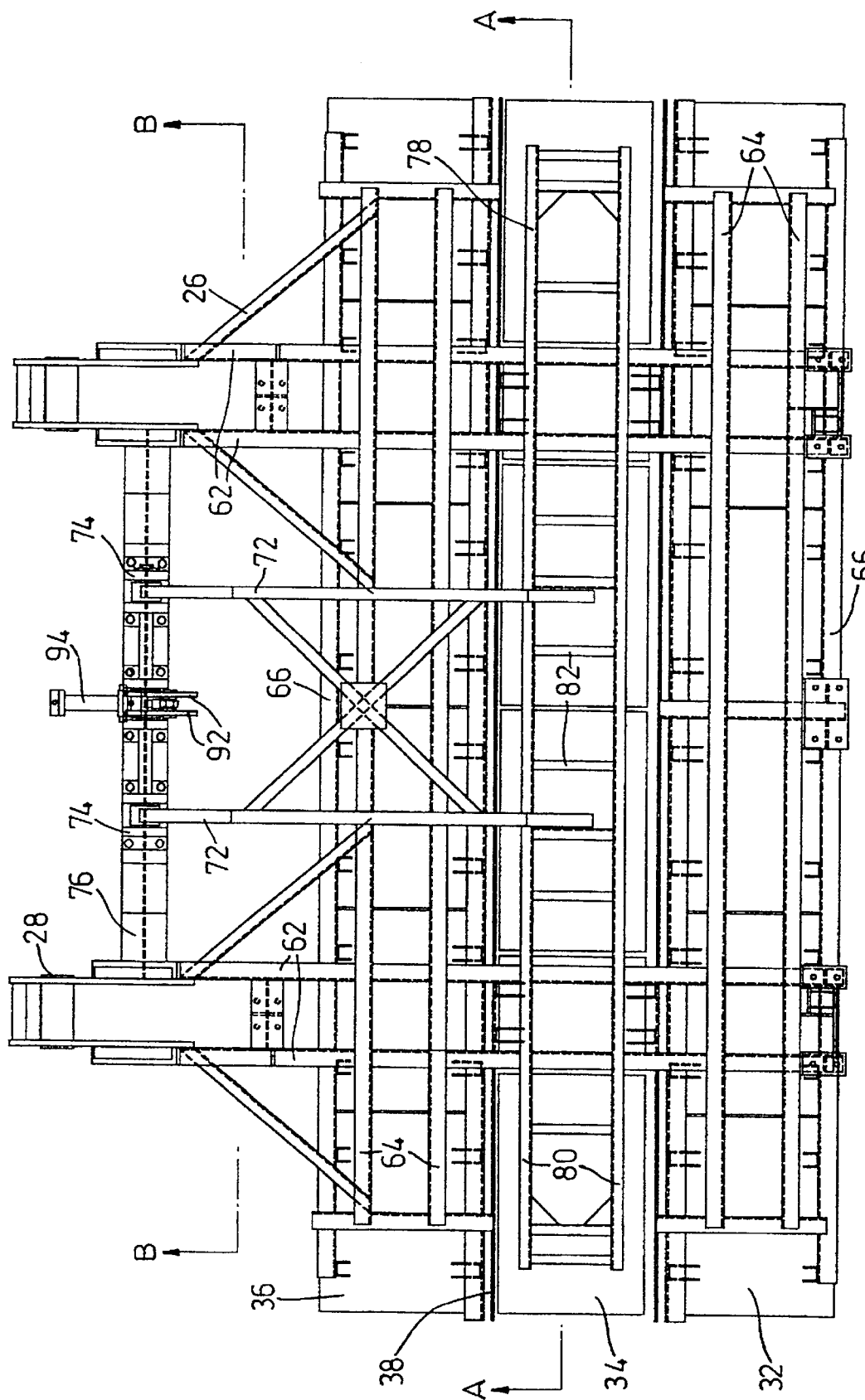
FIG. 2 is a plan view of the upper heat shield panels and their support structure in one module of the heat shield arrangement of FIG. 1.
Figure 3:
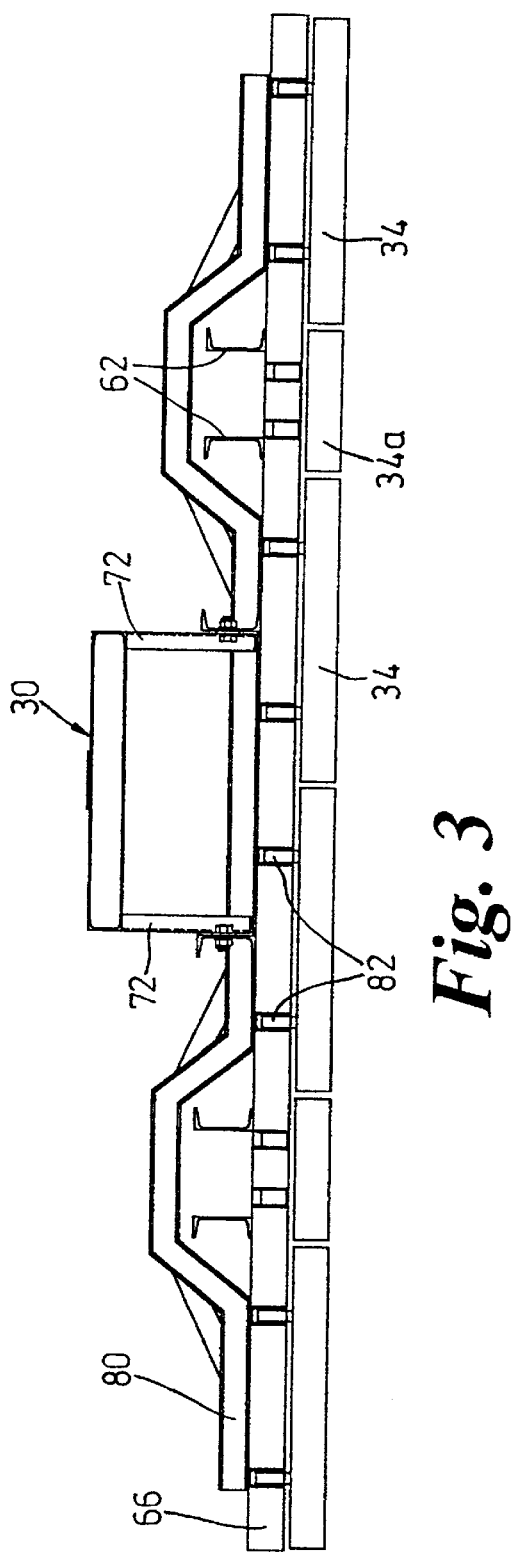
FIG. 3 is a sectional view of the panels and support structure in FIG. 2 on the plane A—A.
Figure 4:
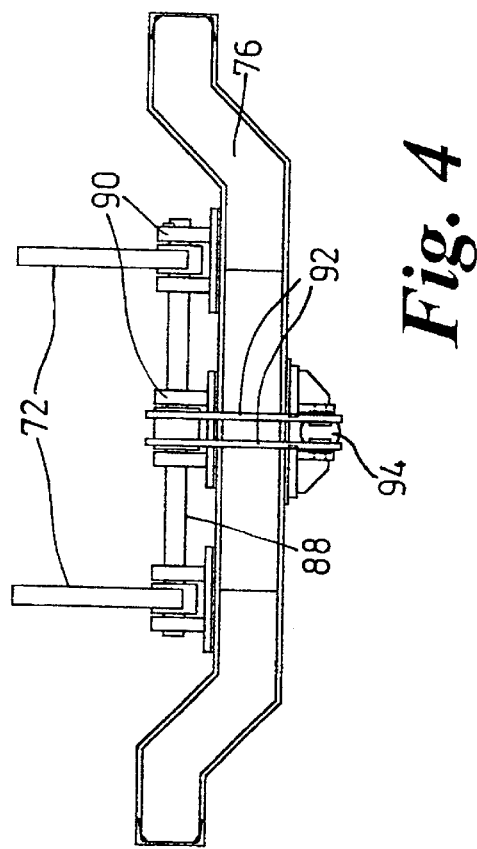
FIG. 4 is a part sectional view on the plane B—B of FIG. 2 showing the interconnection of upper primary and auxiliary frames of the support structure.
Figure 5:
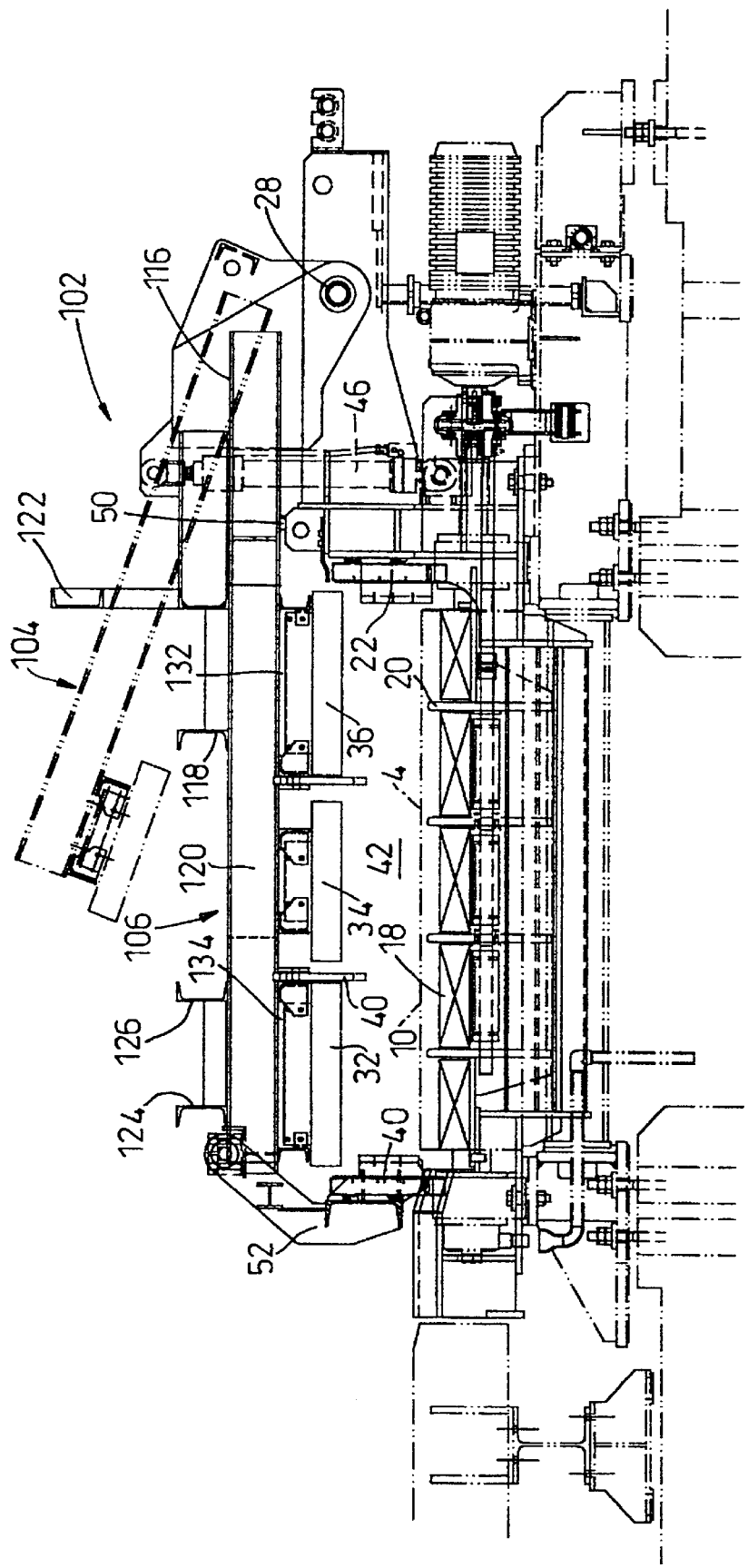
FIG. 5 is a transverse cross-sectional view of a transfer table provided with an alternative form of heat shield arrangement according to the invention.
Figure 6:
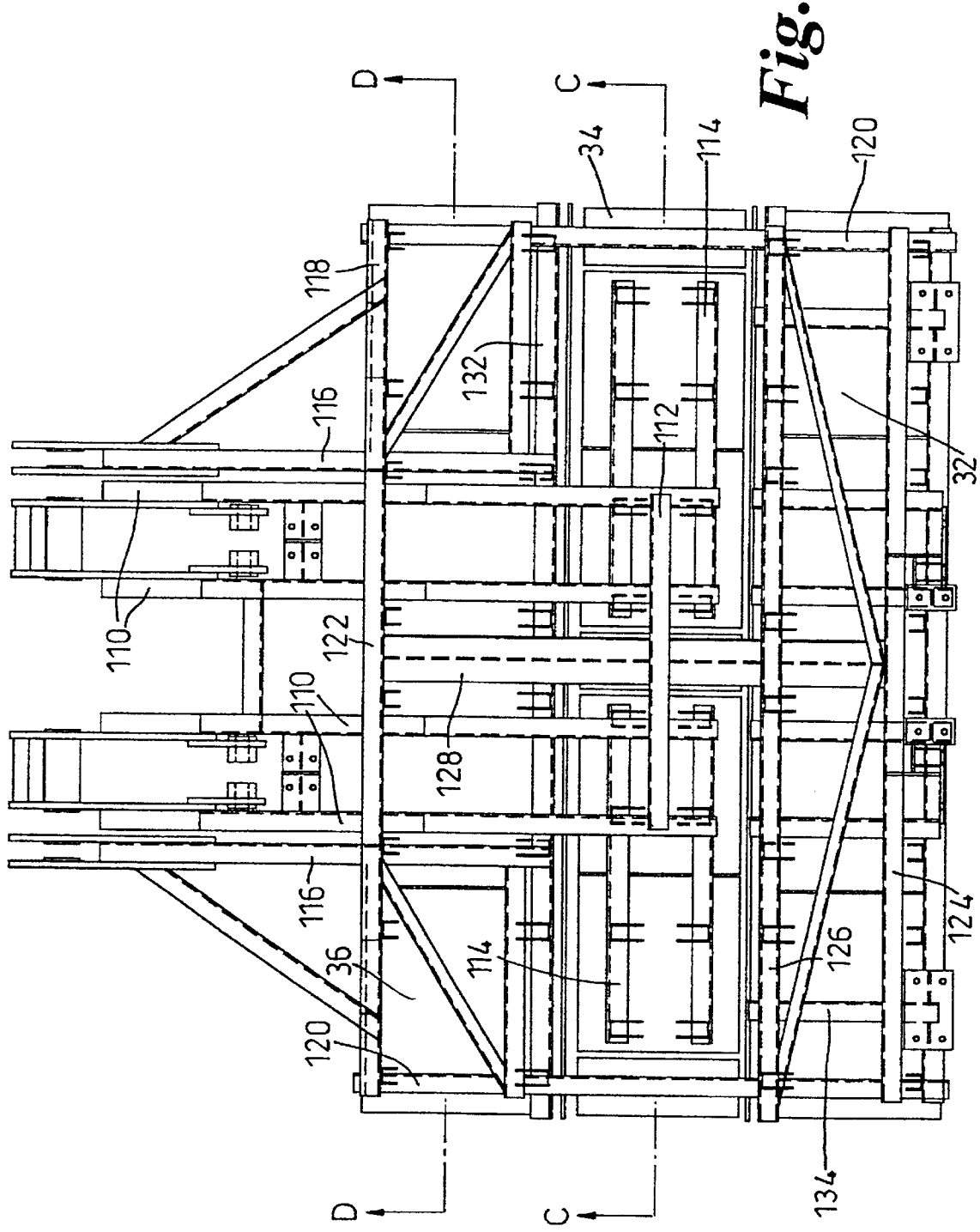
FIG. 6 is a plan view of the upper heat shield panels and their support structure in one module of the heat shield arrangement of FIG. 5.

As FIG. 2 shows, the upper primary frame 26 has two pairs of cantilever arms 62 extending from the frame pivot mountings 28 and spanned by pairs of cross-beams 64. Suspended from the arms 62 are a pair of narrow rectangular sub-frames 66 from which the laterally outer series of panels 32,36 depend. The auxiliary frame 30 is generally T-shaped in plan, with cantilever arms 72 extending from pivot mountings 74 on a cranked inner cross-beam 76 of the primary frame 26 and carrying a narrow rectangular sub-frame 78 lying between the sub-frames 66 of the main frame. Depending from the main beams 80 of the sub-frame 78 are transverse supports 82 carrying the central heat shield panels 34 but where the beams 80 cross the cantilever arms 62 of the main frame they are arched over them, as shown in FIG. 3. Shorter heat shield panels 34a depend from the cantilever arms 62 of the main frame at these crossing regions to form with the panels 34 on the sub-frame 78 a continuous row of panels along the central region of the hot material path 42.

The cantilever arms of the auxiliary frame are keyed to a torque shaft 88 mounted on bearings 90 on the cranked cross-beam 76 extending between the cantilever arms 62 of the primary frame. A pair of cranked links 92 are also keyed to the shaft 88 at their upper ends and are pivoted at their lower ends to the piston of a ram 94. The body of the ram 94 is in turn pivoted on lugs 96 extending from the cross-beam 76. By extending the ram, the auxiliary frame can thus be swung from its full-line position, in which its heat shield panels 34 are coplanar with the panels 32,36 of the primary frame, to the raised position relative to the main frame shown in broken lines in FIG. 1, which allows heat to radiate upwards freely from the central region of the hot material path 42.

It will be understood without further illustration that the drive means for the displacement of both the upper and lower central panels can be operated in a coordinated manner by a control system (not shown) to vary the heat insulating effect of the panels simultaneously at both faces of a transfer bar when required.

As already mentioned, the roller table will typically be provided with a series of similar heat shield modules of the form described to provide a shielded hot material path along the length of the table. The pivoting of the panels can be operated simultaneously or serially as required to vary the heat insulating effect in order to obtain different patterns of temperature distribution, both head to tail and laterally of a transfer bar, before the bar is discharged to a finish rolling process.

FIGS. 5 to 8 illustrate an alternative form of support structure for the upper heat shield panels in a roller table installation that is similar in all other respects to the first described embodiment, including the provision of the bottom and side panels 18,22,40 and the means for displacing selected bottom panels.

The main lifting cylinders 46 for movable upper frame structure 102 are now connected to an auxiliary frame 104 carrying the central heat shield panels 34 and not to the larger primary frame 106 carrying the laterally outer series of panels 32,36. The auxiliary and primary frames 104,106 are both pivotable on the pivot support 28. The auxiliary frame is attached to the support by two pairs of cantilever arms 110 joined near their outer ends by a cross-beam 112. Each pair of arms carries an elongate sub-frame 114 from which a pair of centre insulating panels 34 depend.

Figure 7:
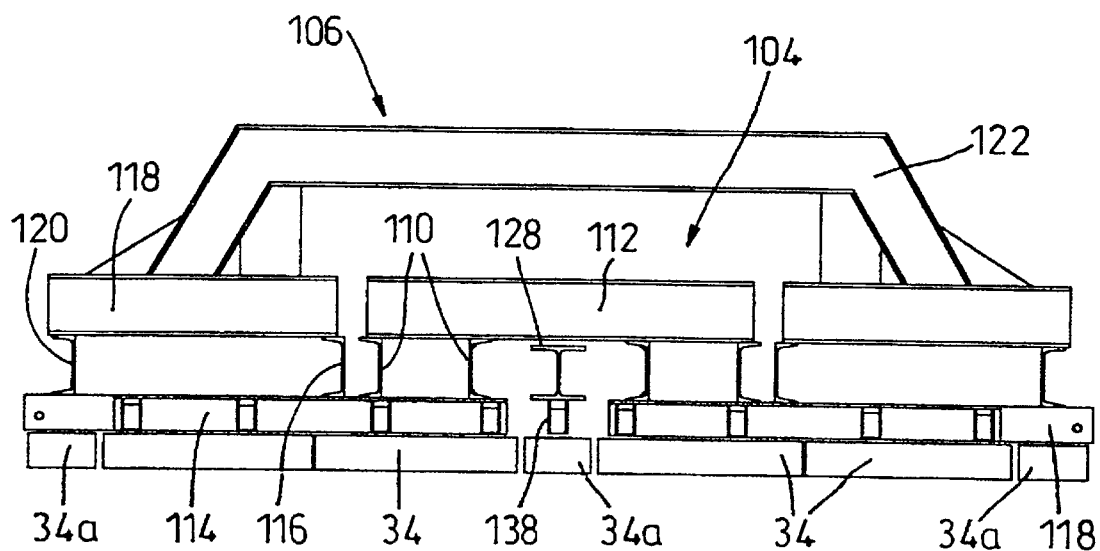
FIG. 7 is a sectional view of the panels and support structure in FIG. 6 on the plane C—C.
Figure 8:
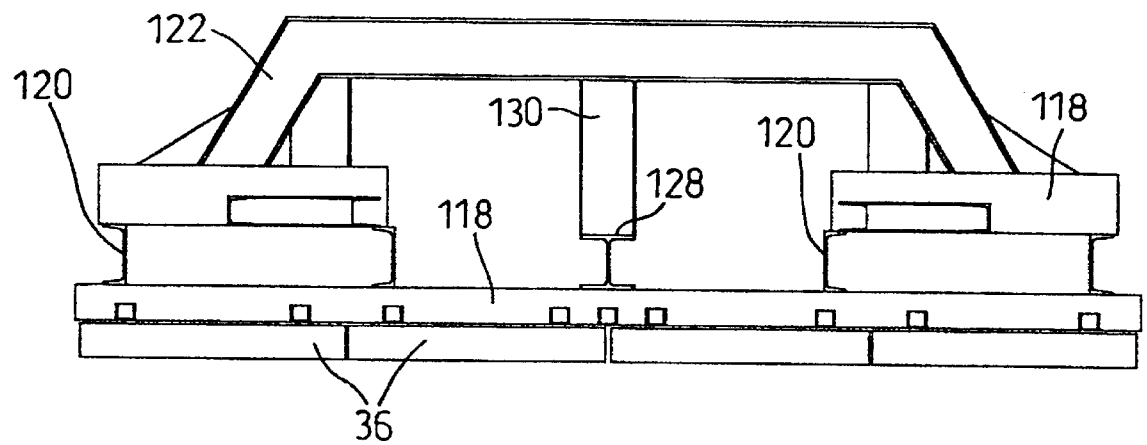
FIG. 8 is a sectional view on the plane D—D in FIG. 6 of the auxiliary frame of the support structure and its panels.

The primary frame 106 is attached to the pivot support 28 by cantilever arms 116 that terminate short of the sub-frames 114. Through short joists 118 the arms 116 are connected to end beams 120 that extend between an inner, arched cross-beam 122 and an outer cross-beam 124, the beams 120,122, 124 forming a rectangular frame in plan. This frame also has a further cross-beam 126 parallel to and in the same plane as the cross-beam 124 and also extending between the end beams 120, and a central beam 128 secured to the lower faces of the cross-beams 124,126 and, through a tie 130, to the arched cross-beam 122. As FIG. 7 shows, in the rest position the auxiliary frame is spaced below the arched cross-beam 122 and the cross-beam 112 of the auxiliary frame extends over the central beam 128. The auxiliary frame is thus capable of some upward pivoting movement independently of the primary frame.

On the primary frame, to the inner side of the sub-frames 114, a narrow rectangular sub-frame 132 is suspended from the primary frame members 116,120,128 and carries the row of panels 36. To the outer side of the sub-frame 114 a second narrow rectangular frame 134 is suspended from the primary frame members 120,128 and carries the row of panels 32. This frame is also shown with a supporting structure 52 for the side panels 40, but these panels and their pivot mountings have been omitted from FIG. 6 for clarity.

Analogously to the first example, where the beams 120, 128 cross the central region of the hot material path they interrupt the run of panels 34 carried by the auxiliary frame. Short supplementary panels 34a are therefore mounted on the beams in this region to maintain the continuity of the heat shield. Connecting bracket 138 between the beam 128 and the central panel is shown in FIG. 7, but for simplicity the corresponding connecting brackets between the outer supplementary panels and the beams 120 are not illustrated.

This alternative heat shield arrangement can be operated to the same effect as the first-described example. However, extension of the rams 46 will now lift the auxiliary frame 104 and its central panels 34 while the laterally outer panels 32,36 remain in place over the table, so allowing increased radiation of heat from the top face of a hot transfer bar in the central region of the material path 42. After an initial lifting movement sufficient for this purpose has been completed, to the extent shown in FIG. 5, the cantilever arms 110 of the auxiliary frame abut on the arched cross-beam 126 of the primary frame, and the auxiliary and primary frames then rise together as the ram 46 is extended further.

Control of the movements of the panels can be performed generally in the same manner as in the first example and therefore do not need to be described further. Should distorted stock strike the bumper bars and so disturb the primary frame 106, the proximity switch 50 will be operated as in the earlier example, but as there is no direct connection between the rams 48 and the primary frame, it is not necessary to provide a lost motion mechanism.

What is claimed is:

1. A heat shield arrangement for a roller table comprising:
   a series of heat shield panels extending over a hot material path along the table, the panels comprising at least two outer panels on laterally opposite sides of at least one central panel,
   a primary support structure carrying said outer panels, said primary support structure being movable so as to raise said outer panels away from said hot material path, and
   an auxiliary support structure carrying said at least one central panel, said auxiliary support structure being movable relative to said primary support so that said central panel is displaceable upwardly from a first position in which it lies adjacent the outer panels to a second position above the outer panels, thereby to create an opening between the outer panels to permit an increase of heat radiation upwardly from a central region of the hot material path,
   said primary support structure and said auxiliary support structure being arranged for movement in conjunction thereby raising said outer panels and said central panel together away from said hot material path.

2. A heat shield arrangement according to claim 1, comprising a lower series of heat shield panels below the hot material path including at least one panel that is displaceable to permit greater radiation loss from a central region of the path.

3. A heat shield arrangement according to claim 1, wherein said auxiliary support structure is mounted on said primary support structure and is displaceable on said primary support structure to raise said central panel relative to the outer panels.

4. A heat shield arrangement for a roller table comprising:
   respective upper and lower series of heat shield panels above and below a hot material path along the table,
   the lower series of panels comprising at least one panel that is displaceable to permit a greater radiation loss from a central region of the path than from laterally outer regions on each side of said central region,
   the upper series of panels comprising at least one central panel and at least two laterally outer panels on opposite sides of said central panel,
   a primary support structure on which said outer panels are suspended which is movable so as to raise said outer panels away from said hot material path, and
   an auxiliary support structure on which said central panel is suspended, said auxiliary support structure being displaceable relative to said primary support structure to raise said central panel from a first position in which it lies adjacent said outer panels, to a second position above the outer panels, to create an opening between said outer panels, to permit an increase in heat radiation from a central region of the hot material path,
   said primary support structure and said auxiliary support structure being arranged for movement in conjunction thereby raising said outer panels and said central panel together away from said hot material path.

5. A heat shield arrangement according to claim 2, comprising displacement control means adapted to move the upper and lower central panels simultaneously away from the hot material path.

6. A heat shield arrangement according to claim 3 wherein the auxiliary support structure is pivotally mounted on the primary support structure.

7. A heat shield arrangement according to claim 6, wherein said primary support structure is displaceable relative to said hot material path to raise said outer panels and said auxiliary support structure carrying said central panel away from said hot material path.

8. A heat shield arrangement according to claim 4, wherein the auxiliary support structure is mounted independently of the primary support structure and is arranged to engage the primary support structure after an initial displacement to its raised position, whereby further upward displacement of the auxiliary support structure causes a corresponding displacement of the primary support structure.

9. A heat shield arrangement according to claim 8, wherein the displacement of the auxiliary support structure is pivoting motion.

* * * * *